(12) United States Patent
Suzuki (10) Patent No.: US 8,923,793 B2
(45) Date of Patent: Dec. 30, 2014

(54) WIRELESS COMMUNICATION DEVICE, WIRELESS COMMUNICATION METHOD, AND WIRELESS COMMUNICATION PROGRAM

(71) Applicant: JVCKenwood Corporation, Yokohama-shi (JP)

(72) Inventor: Yasunori Suzuki, Yokohama (JP)

(73) Assignee: JVCKenwood Corporation (JP)

( * ) Notice: Subject to any disclaimer, the term of this patent is extended or adjusted under 35 U.S.C. 154(b) by 6 days.

(21) Appl. No.: 13/943,106

(22) Filed: Jul. 16, 2013

(65) Prior Publication Data

US 2014/0087679 A1    Mar. 27, 2014

(30) Foreign Application Priority Data

Sep. 25, 2012 (JP) ................................. 2012-210540

(51) Int. Cl.
*H04B 1/10* (2006.01)
*H04B 1/00* (2006.01)
*H04B 1/12* (2006.01)

(52) U.S. Cl.
CPC ..................... *H04B 1/123* (2013.01)
USPC ....... 455/307; 455/63.1; 455/67.13; 455/296; 455/339

(58) Field of Classification Search
CPC .... H04B 1/1036; H04B 1/123; H04B 1/1027; H04B 2001/1063; H04B 2001/1072

USPC ............... 455/63.1, 67.13, 226.1, 226.3, 296, 455/307, 339; 375/346, 350
See application file for complete search history.

(56) References Cited

U.S. PATENT DOCUMENTS

| | | | | |
|---|---|---|---|---|
| 5,394,110 A | * | 2/1995 | Mizoguchi | 375/233 |
| 5,528,627 A | * | 6/1996 | Yanagi et al. | 375/232 |
| 6,101,217 A | * | 8/2000 | Gut | 375/222 |
| 6,980,609 B1 | * | 12/2005 | Ahn | 375/343 |
| 7,418,033 B2 | * | 8/2008 | Barksdale | 375/232 |
| 8,050,370 B2 | * | 11/2011 | Yamamoto et al. | 375/350 |

FOREIGN PATENT DOCUMENTS

JP    10224185    8/1998

* cited by examiner

*Primary Examiner* — Quochien B Vuong
(74) *Attorney, Agent, or Firm* — Cantor Colburn LLP (57) ABSTRACT

A wireless communication device includes a demodulation unit which demodulates a predetermined reception frequency, an S/N improvement processing unit which performs an S/N improvement process on a demodulated signal output from the demodulation unit, a first filter which performs an adaptive operation with respect to a frequency having a largest amplitude in a signal output from the S/N improvement processing unit, and outputs a filter coefficient updated by the adaptive operation, a controller which calculates the frequency of the largest amplitude defined by the filter coefficient output from the first filter, and controls the demodulation unit to update the reception frequency so as to reduce a difference between the frequency having the largest amplitude and a predetermined frequency, and a second filter which limits a range of a frequency bandwidth of the demodulated signal based on the frequency having the largest amplitude.

7 Claims, 4 Drawing Sheets

WIRELESS COMMUNICATION DEVICE, WIRELESS COMMUNICATION METHOD, AND WIRELESS COMMUNICATION PROGRAM

CROSS-REFERENCE TO RELATED PATENT APPLICATIONS

This application claims the benefit of Japanese Patent Application No. 2012-210540, filed on Sep. 25, 2012, in the Japan Patent Office, the disclosure of which is incorporated herein in its entirety by reference.

BACKGROUND OF THE INVENTION

1. Field of the Invention

The present invention relates to a wireless communication device, a wireless communication method, and a wireless communication program, and more particularly, to a technology of performing product detection on a signal received from another wireless communication device by using an arbitrary oscillation frequency, and using a demodulated signal through the product detection.

2. Description of the Related Art

In a communication method (telegraphic communication) in which a continuous wave (CW) is intermittently sent/received as codes, without being limited to amateur wireless communication, a signal whose frequency is close to a transmission frequency (frequency of a received signal) of a counterpart station and generated by a beat frequency oscillator (BFO) is mixed with the transmission frequency, and beats are generated (product detection) so as to make the CW audible. A demodulation frequency is a difference between a reception frequency and an oscillation frequency of the BFO. A pitch frequency denotes a difference between the reception frequency and the oscillation frequency of the BFO in a case where the transmission frequency of the counterpart station and the reception frequency of a self station are equal to each other. The pitch frequency is generally an arbitrary frequency in a 400 to 800 Hz frequency range. Also, since an audible range is different for each person, a pitch frequency is variable according to a user in a high-end wireless device (multi-functional device). When the reception frequency may be set so that the demodulation frequency is a desired pitch frequency, the reception frequency of the self station may be appropriately tuned (zero-in) with respect to the transmission frequency of the counterpart station.

Also, in order to maximize utilizing efficiency of the frequency, it needs to coincide the transmission frequency of the counterpart station with a transmission frequency (and the reception frequency) of the self station. Here, as a method of tuning the reception frequency of the self station to the transmission frequency of the counterpart station, a user mainly performs a manipulation of changing the reception frequency manually so that a tone of the CW demodulated sound can be matched to a side tone (monitoring sound during key-down in order to transmit the CW). By setting a frequency of the side tone to be equal to a pitch frequency, the frequency of the side tone may serve as a reference for the demodulation. That is, when the user performs a manipulation of matching a tone of the CW to a tone of the side tone, the frequency of the CW demodulated sound can match the frequency of the designated pitch frequency, and accordingly, the reception frequency of the self station may be properly tuned to the transmission frequency of the counterpart station.

However, in regard to the above tuning manipulation, the user needs to be skilled. The patent document 1 discloses a wireless device to address this problem.

The wireless device has a receiving circuit, an auto notch filter, a frequency determination processing filter, and a frequency synthesizer. The receiving circuit decodes an input signal to output the decoded signal as a reception signal based on an output frequency from the frequency synthesizer. The auto notch filter performs an adaptation operation, in which a filter coefficient is updated so that a notch frequency is suitable for the reception signal output from the receiving circuit, and outputs the filter coefficient. The frequency determination processing circuit calculates a difference between a notch frequency that is obtained from the filter coefficient output from the auto notch filter and a pitch frequency that is set in advance, and controls an output frequency of the frequency synthesizer so that the above difference becomes zero. As such, tuning of the CW may be performed automatically.

However, according to the wireless device disclosed in the patent document 1, only the automatic tuning has been considered, and there is no consideration of a case where an S/N (signal-to-noise ratio) of the CW is degraded. That is, according to the wireless device disclosed in the patent reference 1, accuracy of the tuning is lowered when the S/N of the CW is degraded. Also, when the CW, the S/N of which is degraded, is demodulated, if a noise reduction for improving the S/N is performed, demodulated sound is also degraded, and thus, suppressed noise becomes unnatural.

3. Prior Art Reference (Patent Reference 1) Japanese Laid-open Patent Publication No. hei 10-224185

SUMMARY OF THE INVENTION

The present invention provides a wireless communication device, a wireless communication method, and a wireless communication program capable of improving precision of a tuning operation, and improving quality of demodulated sound.

According to an aspect of the present invention, provided is a wireless communication device including: a demodulation unit which demodulates a predetermined reception frequency; an S/N improvement processing unit which performs an S/N improvement process on a demodulated signal output from the demodulation unit; a first filter which performs an adaptive operation with respect to a frequency having a largest amplitude in a signal output from the S/N improvement processing unit, and outputs a filter coefficient updated by the adaptive operation; a controller which calculates the frequency of the largest amplitude defined by the filter coefficient output from the first filter, and, on the basis of a difference between the frequency having the largest amplitude and a predetermined frequency, controls the demodulation unit to update the reception frequency so as to reduce the difference; and a second filter which limits a range of a frequency bandwidth of the demodulated signal on the basis of the frequency having the largest amplitude.

According to another aspect of the present invention, provided is a wireless communication method including: demodulating a predetermined reception frequency; performing an S/N improvement process on a demodulated signal; performing an adaptive operation with respect to a frequency of a largest amplitude in the demodulated signal after the S/N improvement process by using a first filter, and updating a filter coefficient of the first filter; calculating the frequency having the largest amplitude defined by the updated filter coefficient, and, on the basis of a difference between the frequency having the largest amplitude and a predetermined frequency, updating the reception frequency in the demodulating so as to reduce the difference; and generating a coefficient of a second filter that limits a range of a frequency bandwidth of the demodulated signal on the basis of the frequency having the largest amplitude.

According to another aspect of the present invention, provided is a wireless communication program for implementing a computer to execute processes of: demodulating a predetermined reception frequency; performing an S/N improvement process on a demodulated signal; performing an adaptive operation with respect to a frequency having a largest amplitude in the demodulated signal after the S/N improvement process by using a first filter, and updating a filter coefficient of the first filter; calculating the frequency of the largest amplitude defined by the updated filter coefficient, and, on the basis of a difference between the frequency having the largest amplitude and a predetermined frequency, updating the reception frequency in the demodulating so as to reduce the difference; and generating a coefficient of a second filter that limits a range of a frequency bandwidth of the demodulated signal on the basis of the frequency having the largest amplitude.

According to another aspect of the present invention, provided is a wireless communication device including: a demodulation unit which demodulates a predetermined reception frequency; an S/N improvement processing unit which performs an S/N improvement process on a demodulated signal output from the demodulation unit; a first filter which performs an adaptive operation with respect to a frequency having a largest amplitude in a signal output from the S/N improvement processing unit, and outputs a filter coefficient updated by the adaptive operation; a controller which determines the frequency having the largest amplitude defined by the filter coefficient output from the first filter; and a second filter which limits a range of a frequency bandwidth of the demodulated signal on the basis of the frequency determined by the controller.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Embodiments of the Invention

Figure 1:
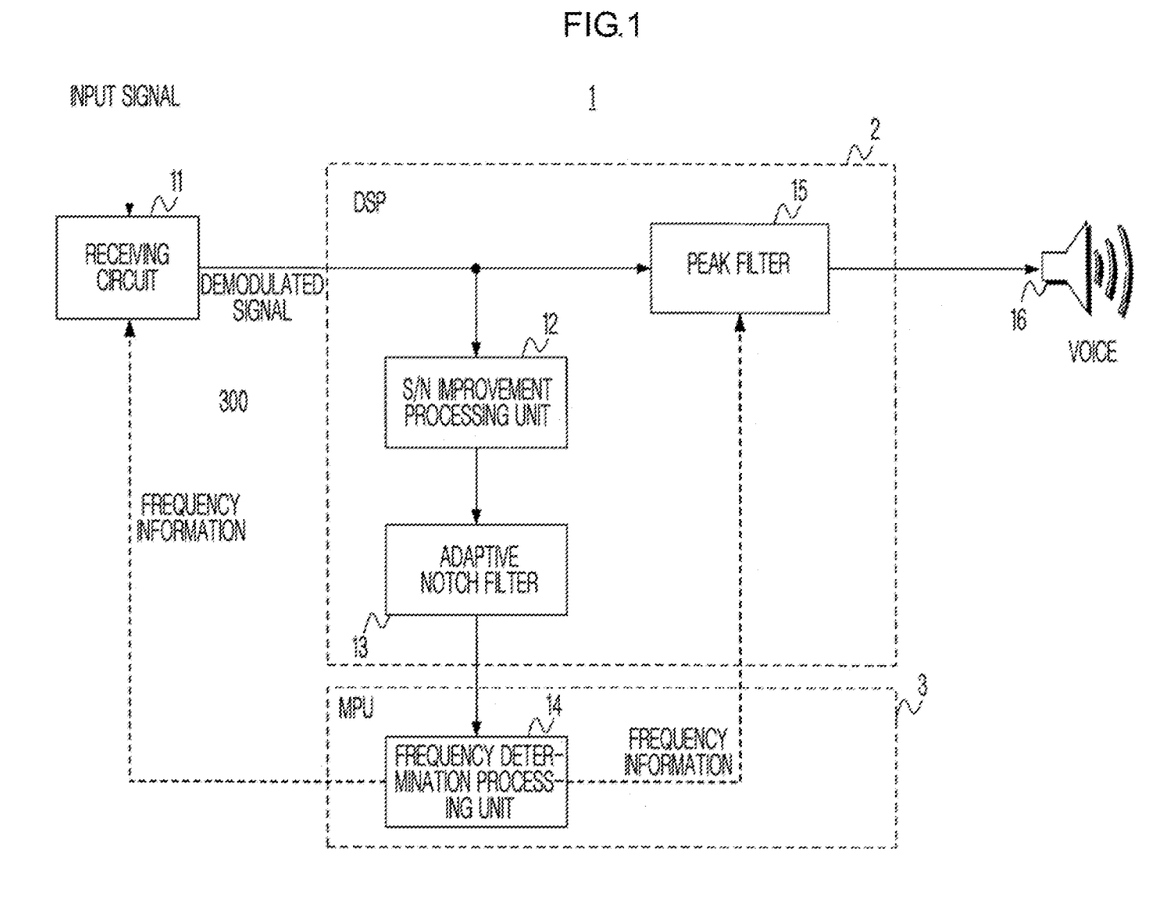
FIG. 1 is a block diagram showing a wireless communication device according to an embodiment of the present invention.

A configuration of a wireless communication device 1 according to an embodiment of the present invention will be described below with reference to FIG. 1. FIG. 1 is a block diagram showing the wireless communication device 1 according to an embodiment of the present invention.

The wireless communication device 1 includes a receiving circuit 11, an S/N (signal-to-noise ratio) improvement processing unit 12, an adaptive notch filter 13, a frequency determination processing unit 14, a peak filter 15, and a speaker 16. For example, a digital signal processor (DSP) 2 of the wireless communication device 1 may function as the S/N improvement processing unit 12, the adaptive notch filter 13, and the peak filter 15, and a micro processing unit (MPU) 3 of the wireless communication device 1 may function as the frequency determination processing unit 14.

The receiving circuit 11 receives a continuous wave (CW; a continuous wave without modulation) transmitted from another wireless communication device as an input signal. The receiving circuit 11 demodulates the received input signal and a signal of reception frequency based on frequency information output from the frequency determination processing unit 14. The receiving circuit 11 outputs the demodulated signal that is demodulated from the input signal to the S/N improvement processing unit 12 and the peak filter 15.

In particular, the receiving circuit 11 is configured to include a frequency synthesizer that determines the reception frequency and a detector that demodulates the input signal by using product detection. In addition, the receiving circuit 11 generates (demodulates) the signal of the reception frequency that is determined by the frequency synthesizer, by using the detector, and outputs the demodulated signal. Here, the receiving circuit 11 changes the reception frequency based on the frequency information output from the frequency determination processing unit 14. According to the above configuration, the reception frequency can be appropriately changed by the control of the frequency determination processing unit 14, and thus, automatic tuning of the CW may be performed.

The S/N improvement processing unit 12 performs an S/N improvement process of the demodulated signal output from the receiving circuit 11. Accordingly, the S/N of the demodulated signal can be improved. The S/N improvement processing unit 12 outputs the demodulated signal, the S/N of which is improved, to the adaptive notch filter 13.

Here, as a method of improving the S/N, an arbitrary method such as an adaptive finite impulse response (FIR) filter process using a least mean squares (LMS) algorithm or a waveform shaping process using an SPAC algorithm may be used. Also, since the methods of improving the S/N are well known in the art, detailed descriptions thereof are omitted. After eliminating noise components except for the target signal by performing processes such as those described above for improving the S/N, the demodulated signal is input to the adaptive notch filter 13, and thus, a tracking precision of the adaptive notch filter 13 with respect to the target signal may be improved.

The adaptive notch filter (auto notch filter) 13 is a notch filter that attenuates a detected signal from the demodulated signal output from the S/N improvement processing unit 12. In particular, the adaptive notch filter 13 attenuates the signals within a predetermined frequency bandwidth range in which the frequency of the detected signal is a center frequency (notch frequency), from among the demodulated signals output from the S/N improvement processing unit 12. Also, the adaptive notch filter 13 is an adaptive filter for tracking a frequency having the largest amplitude as a notch frequency, in the demodulated signals. The adaptive notch filter 13 appropriately updates a filter coefficient so that the notch frequency of the adaptive notch filter 13 is equal to the frequency having the largest amplitude in the demodulated signals. That is, since the adaptive notch filter 13 tracks the demodulation frequency so that the notch frequency coincides with the demodulation frequency, the demodulation frequency may be defined as the notch frequency from the filter coefficient. In addition, the adaptive notch filter 13 generates filter coefficient information representing the filter coefficient after update, and outputs the filter coefficient information to the frequency determination processing unit 14.

Here, the filter coefficient is stored, for example, in a storage device included in the wireless communication device, and is updated when the adaptive notch filter 13 rewrites the filter coefficient in the storage device. The storage device may be an arbitrary storage device such as, for example, a memory or a hard disk.

The frequency determination processing unit 14 calculates the notch frequency of the adaptive notch filter 13 based on the filter coefficient represented by the filter coefficient information output from the adaptive notch filter 13. As disclosed in Patent Reference 1, in the adaptive notch filter, the notch frequency can be generally calculated from the filter coefficient thereof. The frequency determination processing unit 14 compares the calculated notch frequency with a pitch frequency that is set in advance to calculate a difference between the notch frequency and the pitch frequency. The frequency determination processing unit 14 changes the reception frequency of the receiving circuit 11 so that the difference becomes zero, on the basis of the calculated difference between the notch frequency and the pitch frequency.

The frequency determination processing unit 14 changes the reception frequency of the receiving circuit 11 so as to reduce the difference between the notch frequency and the pitch frequency, which is calculated from the filter coefficient, and thus, the demodulation frequency of the receiving circuit 11 may be matched with the pitch frequency. As described above, the modulated signal processed by the adaptive notch filter 13 becomes noise; however, in the present embodiment, the tracking property of the adaptive notch filter 13 is used to detect the demodulation frequency.

Therefore, the frequency determination processing unit 14 generates frequency information for reducing the difference between the pitch frequency and the notch frequency, in order to change the reception frequency of the receiving circuit 11, and outputs the frequency information to the receiving circuit 11. The receiving circuit 11 changes the frequency of the frequency synthesizer in order to change the reception frequency, according to the frequency information output from the frequency determination processing unit 14. For example, if the notch frequency is 500 Hz higher than the pitch frequency, the frequency information is generated to represent a frequency that is 500 Hz lower than the frequency represented by the current frequency information. The receiving circuit 11 lowers the reception frequency by as much as 500 Hz to the frequency represented by the frequency information. Accordingly, the demodulation of the input signal is performed at the demodulation frequency that is equal to the pitch frequency.

The peak filter 15 eliminates other signal components except for the signal detected as the target signal from the demodulated signals output from the receiving circuit 11, and has a variable coefficient. In particular, the peak filter 15 eliminates signal components except for a predetermined frequency range having a certain peak frequency that is the frequency of the target signal as a center frequency in the demodulated signals. The peak filter 15 outputs the demodulated signal, in which the signal components except for the target signal are eliminated, to the speaker 16. Accordingly, sound quality of the voice output from the speaker 16 may be improved on the basis of the demodulated signals.

Here, the peak filter 15 is an adaptive filter for tracking the peak frequency according to the control of the frequency determination processing unit 14. In particular, the frequency determination processing unit 14 generates frequency information representing the notch frequency that is calculated on the basis of the filter coefficient of the adaptive notch filter 13, and outputs the frequency information to the peak filter 15. The peak filter 15 updates the coefficient so that the peak frequency becomes the notch frequency represented by the frequency information output from the frequency determination processing unit 14. Here, as described above, the notch frequency is updated to be the frequency having the largest amplitude in the demodulated signal. Therefore, the peak filter 15 can easily define the frequency having the largest amplitude that has to be defined as the peak frequency in the demodulated signals output from the receiving circuit 11, by using the notch frequency represented by the frequency information. The frequency determination processing unit 14 may generate the coefficient of the peak filter 14 by using the notch frequency, and may output the coefficient.

The speaker 16 is a voice output device that outputs a voice represented by the demodulated signal that is output from the peak filter 15.

The present embodiment concentrates on the following points with respect to the above described configuration.

As a first point of the invention, the S/N of the demodulated signal is improved, and the adaptive notch filter 13 filters the demodulated signal, the S/N of which is improved. Accordingly, even in a poor communication environment in which noise is added to the input signal (CW), the performance of tracking the target signal in the adaptive notch filter 13 may be improved. Also, preferably, as described above, in order to improve the S/N, the process for improving the S/N rather than the sound quality, for example, the adaptive FIR filter process using the LMS algorithm or the waveform shaping process using the SPAC algorithm, may be performed.

As a second point of the invention, when the reception frequency is adjusted on the basis of the difference between the notch frequency and the pitch frequency, which is calculated from the filter coefficient of the adaptive notch filter 13, the calculated notch frequency becomes equal to the frequency of the demodulated sound, and by using the above property, the coefficient of the peak filter 15 is also updated on the basis of the calculated notch frequency. That is, the information calculated to perform the tuning operation may be effectively used to perform the sound quality improving process in the peak filter 15. Accordingly, there is no need to track the target signal additionally in the peak filter 15, and thus, a configuration of the peak filter 15 may be simplified, and manufacturing costs of the wireless communication device 1 may be reduced.

As a third point of the present invention, the demodulated signal before performing the S/N improvement process in the S/N improvement processing unit 12 is input to the peak filter 15, and the voice is output from the speaker 16 based on the output from the peak filter 15. Then, besides the improvement of the tracking performance in the adaptive notch filter 13 by improving the S/N, the voice may be output with excellent sound quality without being degraded due to the S/N improvement process.

The above third point is valid even when the automatic tuning of the reception frequency is not performed, and the peak filter may be used as the peak filter performing automatic tracking. Since the precision of the tracking is excellent due to that the center frequency of the demodulated signal is calculated after improving the S/N, an IIR filter with steep characteristic even when having fewer taps may be used as the peak filter.

Figure 2:
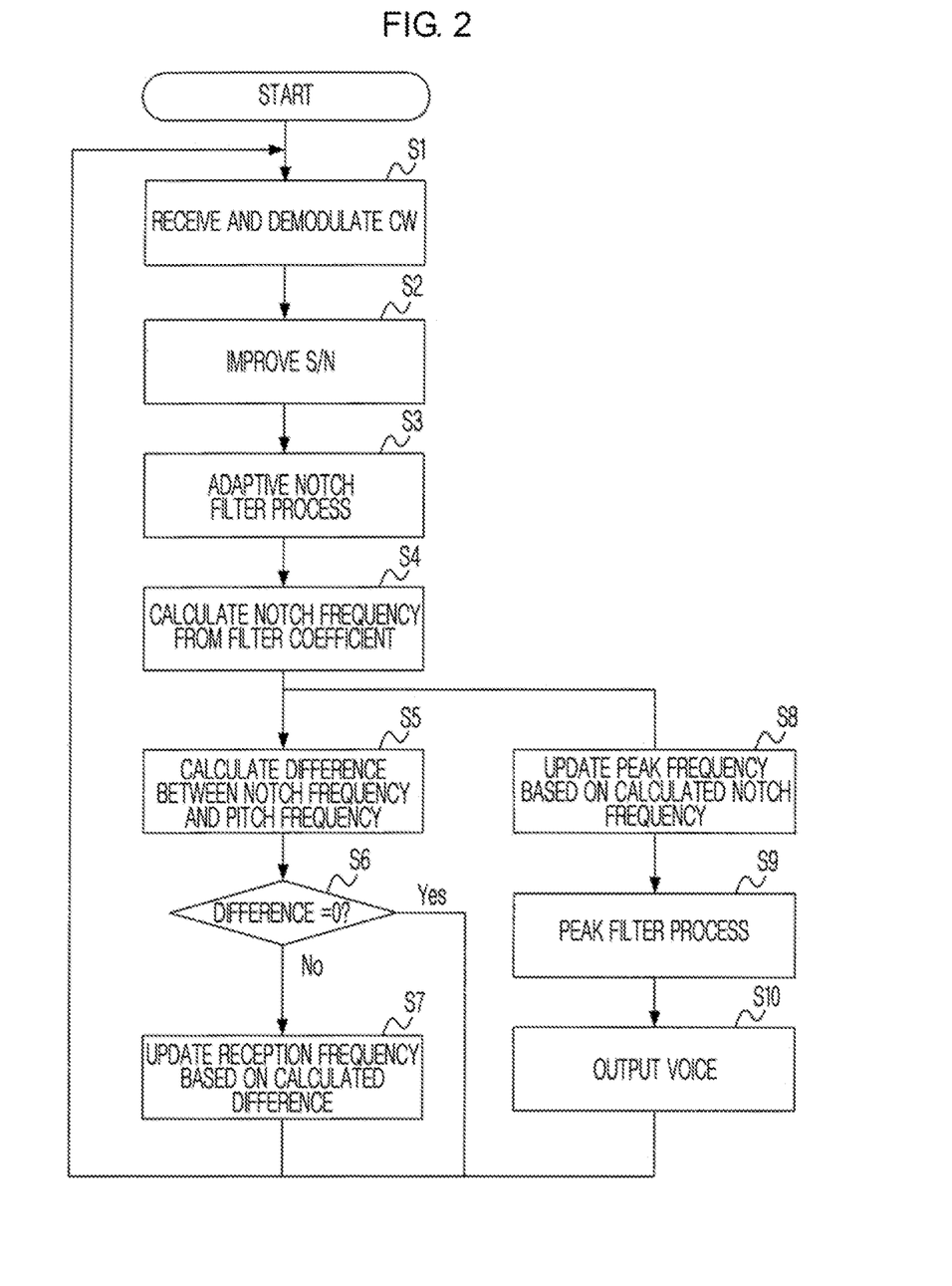
FIG. 2 is a flowchart describing processes of the wireless communication device according to the embodiment of the present invention.
Figure 3:
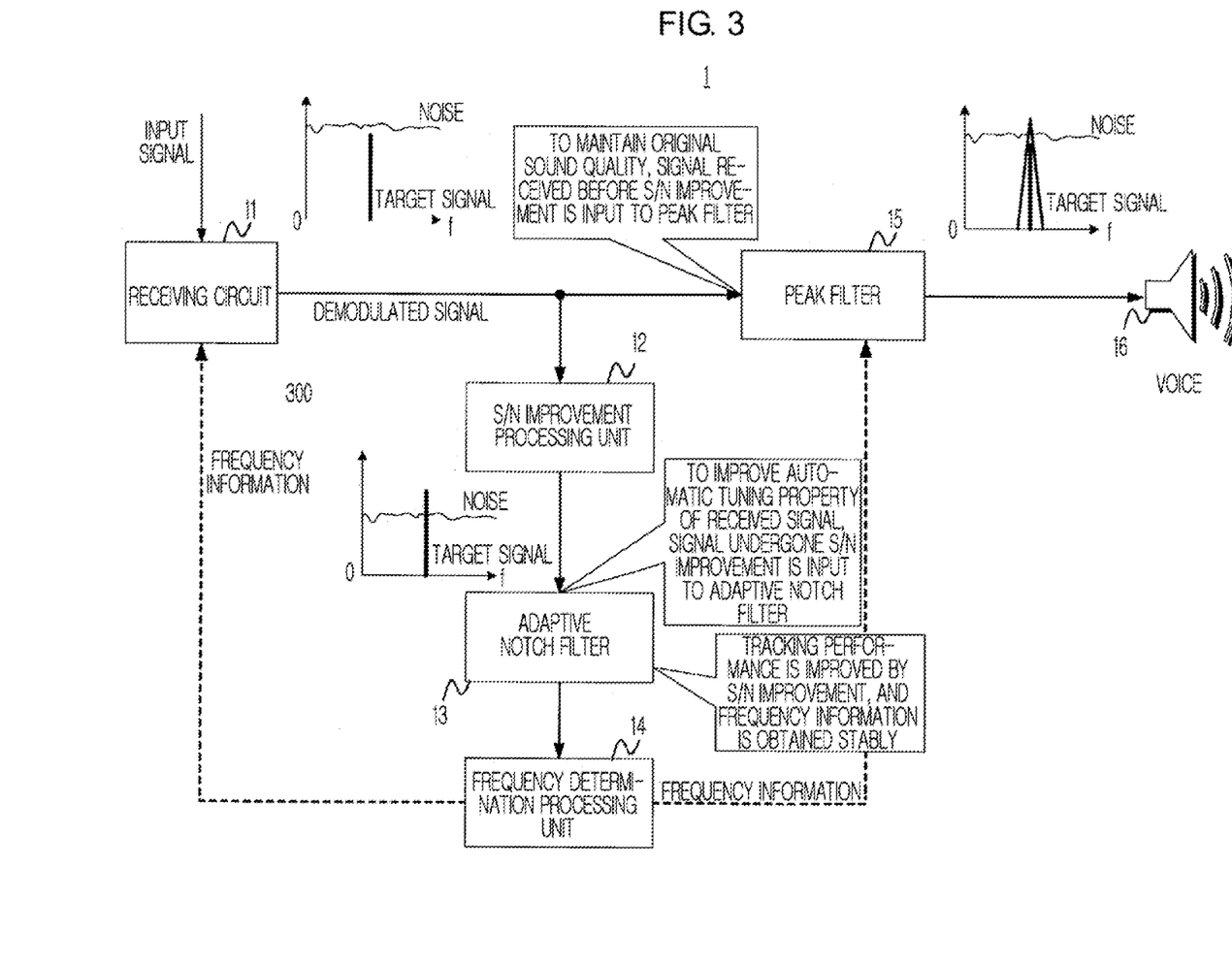
FIG. 3 is a conceptual view showing processes of the wireless communication device according to the embodiment of the present invention.

Next, processes of the wireless communication device 1 according to an embodiment of the present invention will be described below with reference to FIGS. 2 and 3. FIG. 2 is a flowchart illustrating processes of the wireless communication device 1 according to the embodiment of the present invention, and FIG. 3 is a conceptual view showing the processes of the wireless communication device 1 according to the embodiment of the present invention.

The receiving circuit 11 receives the CW transmitted from another wireless communication device as an input signal, and demodulates and outputs the received input signal to the S/N improvement processing unit 12 and the peak filter 15 as a demodulated signal (S1).

The S/N improvement processing unit 12 performs an S/N improvement process on the demodulated signal output from the receiving circuit 11, and outputs the demodulated signal after performing the S/N improvement process to the adaptive notch filter 13 (S2).

The adaptive notch filter 13 updates the filter coefficient so that the notch frequency coincides with the frequency having the largest amplitude in the demodulated signal output from the S/N improvement processing unit 12, and outputs the filter coefficient information representing the filter coefficient after the update to the frequency determination processing unit 14 (S3).

The frequency determination processing unit 14 calculates the notch frequency of the adaptive notch filter 13 based on the filter coefficient represented by the filter coefficient information output from the adaptive notch filter 13 (S4). The frequency determination processing unit 14 compares the calculated notch frequency with the pitch frequency to calculate the difference between the notch frequency and the pitch frequency (S5).

The frequency determination processing unit 14 determines whether the calculated difference is 0 or not (S6). When it is determined that the calculated difference between the frequencies is not 0 (S6: No), the frequency determination processing unit 14 updates the reception frequency of the receiving circuit 11 so that the difference becomes 0 on the basis of the calculated difference (S7). Meanwhile, when it is determined that the calculated difference between the frequencies is 0 (S6: Yes), the frequency determination processing unit 14 does not update the reception frequency.

Also after calculating the notch frequency (S4), the frequency determination processing unit 14 updates the peak frequency of the peak filter 15 to be the calculated notch frequency (S8). Here, in operation S8, the filter coefficient of the peak filter 15, which is updated on the basis of the notch frequency represented by the frequency information output from the frequency determination processing unit 14, can be dynamically calculated as follows.

Here, when it is assumed that the IIR filter is used as the peak filter 15, a transfer function H(z) may be calculated using Equation 1 below. Here, $\omega_n$ denotes a peak angular frequency, $f_s$ denotes a sampling frequency of the peak filter 15, and $f_p$ is a peak frequency updated by the frequency determination processing unit 14. Also, r denotes a coefficient determining steepness of the peak characteristic of the peak filter, and when r is close to 1, it denotes that the peak characteristic is steep. Here, in order to generate a sharp peak filter that may accurately eliminate the components rather than the target signal, r is set in advance as an integer that is slightly less than 1.

[Equation 1]

$$H(z) = \frac{(1-r)(1-z^2)}{1+Wz^{-1}+r^2z^{-2}} \quad (1)$$

$$\begin{pmatrix} W = -2\cos\omega_n \\ 0 \le r < 1 \end{pmatrix}$$

Here, the peak angular frequency $\omega_n$ may be calculated using Equation 2 below.

[Equation 2]

$$\omega_n = 2\pi \frac{f_p}{f_s} \quad (2)$$

Based on the frequency information output from the frequency determination processing unit 14, the peak frequency is adjusted, and the filter coefficient W is dynamically calculated on the basis of the peak frequency, and then, the adaptive peak filter 15 having a performance of tracking the target signal is generated. In particular, as shown in Equation 2, a value that is obtained by dividing the peak frequency $f_p$ by the sampling frequency $f_s$ is multiplied by $2\pi$ to calculate the peak angular frequency $\omega_n$. In addition, as shown in Equation 1, the filter coefficient W is calculated as $-2 \cos \omega_n$ based on the peak angular frequency $\omega_n$. Accordingly, the demodulated signal after being processed by the peak filter 15 may be calculated by using the transfer function H(z) of the peak filter 15 using the calculated filter coefficient W.

The peak filter 15 eliminates signal components except for a certain signal as a target signal in the demodulated signal, on the basis of the peak frequency updated according to the control of the frequency determination processing unit 14, and outputs the demodulated signal after elimination to the speaker 16 (S9).

The speaker 16 outputs the voice represented by the demodulated signal based on the demodulated signal output from the peak filter 15 (S10).

By repeatedly performing the above described processes S1 through S10, the reception frequency of the wireless communication device 1 is tuned to the transmission frequency of the CW transmitted from another wireless communication device, and then, outputs a voice based on the CW.

Another Embodiment of the Present Invention

Sub-configurations that will be described below can be added to the above described configuration.

(Sub-Configuration 1)

As a first sub-configuration, the peak filter 15 detects a carrier level (an amplitude and a voltage value) of the demodulated signal. If the detected signal level is equal to or less than a reference value, the filter coefficient may not be updated.

Figure 4:
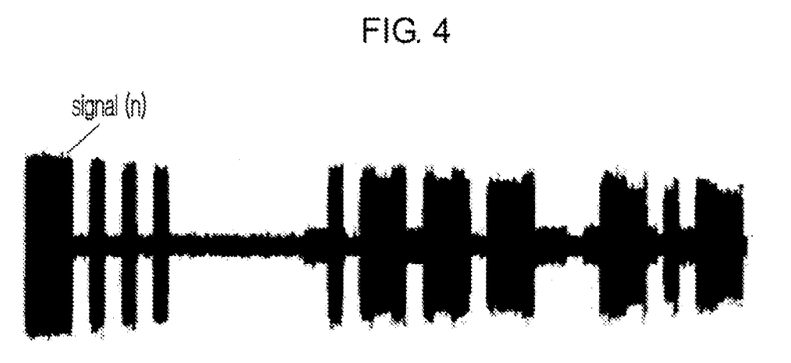
FIG. 4 is a view showing signal levels of a continuous wave (CW) according to an embodiment of the present invention.
Figure 5:
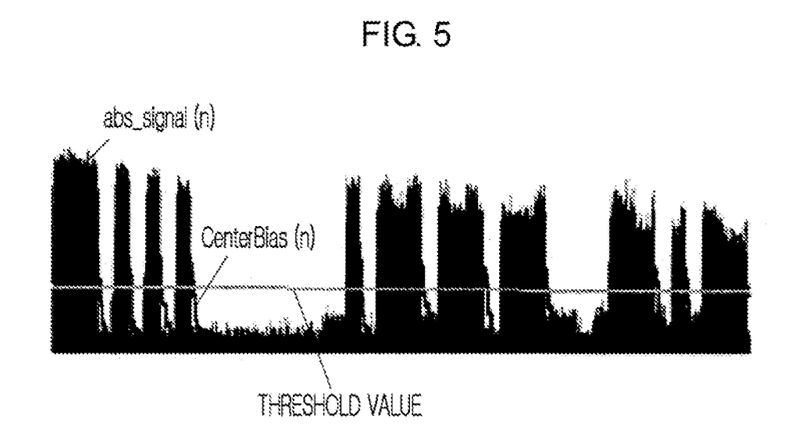
FIG. 5 is a view showing absolute values of the signal levels of CW shown in FIG. 4.

For example, when an input signal that becomes a demodulated signal signal(n) as shown in FIG. 4 is received, an absolute value abs_signal(n) of the demodulated signal signal(n) is calculated as shown in FIG. 5, and a value that is obtained by integrating the calculated absolute value in a time base direction (CenterBias(n)) is calculated as a reference value. Here, n denotes a positive integer representing time. In addition, at a certain time point k, in a case where the absolute value abs_signal(k) is greater than the integrated value CenterBias(k), it is determined that there is a carrier, and the filter coefficient of the peak filter 15 is updated. Also, at a certain time point k, in a case where the absolute value abs_signal(k) is less than the integrated value CenterBias(k), and it is determined that there is no carrier, the filter coefficient of the peak filter 15 is updated. Also, in this case, the update of the filter coefficient of the peak filter 15 may be performed slower than in the case where there is the carrier. As described above, the integrated value of the absolute value is used as the reference value for determining whether the carrier exists, and thus, existence of the carrier may be determined regardless of a magnitude of the amplitude (voltage value) of the demodulated signal.

Also, when the integrated value CenterBias(k) is greater than a threshold value, the filter coefficient of the peak filter 15 may be updated. That is, when the integrated value CenterBias(k) is equal to or less than the threshold value, the filter coefficient of the peak filter 15 may not be updated. Also, the threshold value may be an arbitrary value that is determined in advance, or may be variable between the absolute value abs_signal(n) and the integrated value CenterBias(n) according to a carrier level of the demodulated signal.

According to the above description, since the telegraphic communication transmits information by an intermittent carrier (for example, via Morse code), the peak filter 15 that stably tracks the target signal only when the carrier exists may be generated, and at the same time, the update of the filter coefficient of the peak filter 15 due to the noise may be prevented. Also, since the detection of the carrier is performed by using the output of the S/N improvement processing unit 12, the existence of the carrier may be clearly detected.

(Sub-Configuration 2)

As a second sub-configuration, the bandwidth of the peak filter 15 (frequency range that is outside a signal component elimination range) may be gradually reduced according to an adaptive operation, in the process of tuning the CW. As such, in the tuning process, the target signal may be prevented from being included in the frequency range, the signal components of which are to be eliminated, at an initial stage where the peak frequency is not appropriately adjusted, and then, the peak filter 15 having a steep slope property may be applied an end stage where the peak frequency is appropriately adjusted, thereby improving sound quality.

Also, it is determined whether the peak frequency is stabilized by using a variation in the peak frequency, and when it is determined that the peak frequency is stabilized (the variation in the peak frequency is minimized), the bandwidth of the peak filter 15 may be reduced (otherwise, the reduction of the bandwidth starts when the above described adaptive operation is performed). As such, since the bandwidth of the peak filter 15 is reduced at a stage where the peak frequency is appropriately adjusted, it may be ensured that the target signal is outside the elimination frequency range.

Also, an arbitrary condition for determining whether the peak frequency is stabilized (whether the variation in the peak frequency is minimized) may be set in advance. For example, the peak filter 15 may determine that the peak frequency is stabilized in a case where a difference between a previous peak frequency and a peak frequency after the update is equal to or less than a predetermined threshold value. Also, when tuning the CW, it may be determined that the peak frequency is stabilized when a difference between the notch frequency and the pitch frequency is within a predetermined range.

Also, the above described first and second sub-configurations may be combined to be used.

Here, the S/N of the demodulated signal may be improved by using a noise removal function such as the adaptive FIR filter using the LMS algorithm; however, sound quality of the original sound is not certainly maintained. For example, voice output from the demodulated signal that is filtered by the filter concentrating on the S/N improvement is degraded since the voice, that is, the target signal, is degraded, and thus, peripheral noise that is suppressed becomes unnatural.

Thus, according to the present embodiments, the demodulated signal, the S/N of which is improved, is input to the adaptive notch filter 13 used to control the tuning operation; however, the demodulated signal before the S/N improvement process is input to the peak filter 15 used to output a voice. Therefore, even when the S/N is inferior around the target signal of the CW, the CW surrounded by noise may be interpreted easily to improve the control of the tuning operation. At the same time, the sound quality of the output voice is the same as that of the original sound. That is, the voice output from the demodulated signal is natural sound, and thus, the user may not feel fatigue even when the user listens to the voice for a long time.

Also, the present invention is not limited to the above embodiments, but may be appropriately modified within the scope of the invention.

In the above embodiment, the adaptive notch filter (auto notch filter) 13 is used as the filter that defines the notch frequency and outputs the filter coefficient subjected to determination to the frequency determination processing unit 14; however, the present invention is not limited thereto. Other adaptive filters may be used provided that the filters may perform the adaptive operation with respect to the frequency having the largest amplitude in the demodulated signal and output the filter coefficient that can define the demodulated frequency. For example, an adaptive peak filter (auto notch filter) may be used.

In the above embodiment, the frequency information output to the peak filter 15 is information representing the reception frequency itself; however, the output information is not limited thereto provided that the information may define the reception frequency, by which the demodulated frequency becomes the pitch frequency. For example, the frequency information may represent the filter coefficient of the adaptive notch filter 13, the peak filter 15 may calculate the reception frequency that the demodulated frequency is equal to the pitch frequency on the basis of the filter coefficient represented by the frequency information, and the calculated reception frequency is used to the adaptive operation.

The wireless communication device 1 according to the embodiments of the present invention may be configured by executing programs that implement the above described embodiments by using the DSP and the MPU included in the wireless communication device 1.

Also, the program may be stored in various types of non-transitory computer readable media, and may be supplied to the wireless communication device 1 (computer). The non-transitory computer readable media include various types of tangible storage media. Examples of the non-transitory computer readable media may include a magnetic recording medium (for example, a flexible disk, a magnetic tape, and hard disk drive), a photomagnetic recording medium (for example, a photomagnetic disk), a CD-ROM (read only memory), CD-R, CD-R/W, a semiconductor memory (for example, a mask ROM, a PROM (Programmable ROM), an EPROM (erasable PROM), a flash ROM, and a RAM (random access memory)). Also, the program may be supplied to the computer via various types of transitory computer readable media. Examples of the transitory computer readable media include electric signals, optical signals, and electronic waves. The transitory computer readable media may supply the program to the computer through wired communication paths such as electric lines and optical fibers, or wireless communication paths.

According to embodiments of the present invention, a wireless communication device, a wireless communication method, and a wireless communication program capable of improving precision of a tuning operation and improving demodulated sound quality may be provided.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A wireless communication device comprising:
a demodulation unit which demodulates a predetermined reception frequency;
an S/N improvement processing unit which performs an S/N improvement process on a demodulated signal output from the demodulation unit;
a first filter which performs an adaptive operation with respect to a frequency having a largest amplitude in a signal output from the S/N improvement processing unit, and outputs a filter coefficient updated by the adaptive operation;
a controller which calculates the frequency of the largest amplitude defined by the filter coefficient output from the first filter, and, on a basis of a difference between the frequency having the largest amplitude and a predetermined frequency, controls the demodulation unit to update the reception frequency so as to reduce the difference; and
a second filter which limits a range of a frequency bandwidth of the demodulated signal on a basis of the frequency having the largest amplitude.

2. The wireless communication device of claim 1, wherein the second filter gradually reduces a frequency range according to execution of the adaptive operation.

3. The wireless communication device of claim 1, wherein the second filter reduces a frequency range when it is determined that a variation in the frequency having the largest amplitude is stabilized on a basis of a predetermined determination criteria.

4. The wireless communication device of claim 1, wherein the second filter performs an adaptive operation with respect to the frequency having the largest amplitude when an absolute value of an amplitude of the demodulated signal is greater than a value obtained by integrating the absolute value of the amplitude.

5. A wireless communication method comprising:
demodulating a predetermined reception frequency;
performing an S/N improvement process on a demodulated signal;
performing an adaptive operation with respect to a frequency of a largest amplitude in the demodulated signal after the S/N improvement process by using a first filter, and updating a filter coefficient of the first filter;
calculating the frequency having the largest amplitude defined by the updated filter coefficient, and, on a basis of a difference between the frequency having the largest amplitude and a predetermined frequency, updating the reception frequency in the demodulating so as to reduce the difference; and
generating a coefficient of a second filter that limits a range of a frequency bandwidth of the demodulated signal on a basis of frequency having the largest amplitude.

6. A non-transitory computer-readable storage medium having recorded thereon a wireless communication program for implementing a computer to execute processes of:
demodulating a predetermined reception frequency;
performing an S/N improvement process on a demodulated signal;
performing an adaptive operation with respect to a frequency having a largest amplitude in the demodulated signal after the S/N improvement process by using a first filter, and updating a filter coefficient of the first filter;
calculating the frequency of the largest amplitude defined by the updated filter coefficient, and, on a basis of a difference between the frequency having the largest amplitude and a predetermined frequency, updating the reception frequency in the demodulating so as to reduce the difference; and
generating a coefficient of a second filter that limits a range of a frequency bandwidth of the demodulated signal on a basis of the frequency having the largest amplitude.

7. A wireless communication device comprising:
a demodulation unit which demodulates a predetermined reception frequency;
an S/N improvement processing unit which performs an S/N improvement process on a demodulated signal output from the demodulation unit;
a first filter which performs an adaptive operation with respect to a frequency having a largest amplitude in a signal output from the S/N improvement processing unit, and outputs a filter coefficient updated by the adaptive operation;
a controller which determines the frequency having the largest amplitude defined by the filter coefficient output from the first filter; and
a second filter which limits a range of a frequency bandwidth of the demodulated signal on a basis of the frequency determined by the controller.

* * * * *